Patented Dec. 16, 1947

2,432,544

UNITED STATES PATENT OFFICE 2,432,544

RESORCINOL-ALDEHYDE COMBINED WITH AROMATIC AMINE-ALDEHYDE RESIN

Philip Hamilton Rhodes, Portland, Maine, assignor, by mesne assignments, to Koppers Company, Inc., a corporation of Delaware No Drawing. Application December 3, 1942, Serial No. 467,789

11 Claims. (Cl. 260—45)

The present invention relates to the production of a resin or resin compound or composition containing an intimate mixture or reaction product of a polyhydroxy benzene-aldehyde and an amine-aldehyde condensation product, one of said condensation products being dispersed in the other. More specifically, the resin or resin composition of the present invention results from condensing a polyhydroxy benzene, its substitution products and/or derivatives, and preferably a dihydroxy benzene, its substitution products and/or its derivatives, with an aldehyde, in the presence of an amine-aldehyde condensation product, said dihydroxy benzene being typified by resorcin.

The resin, or resinous composition of the present invention is preferably produced by the in situ condensation of a polyhydroxy benzene, its substitution products, and/or derivatives, and an aldehyde, said in situ condensation being carried out in the presence of a partially or a substantially completely reacted amine-aldehyde condensation product. In the preferred form of the invention, it is desired that the amine-aldehyde condensation product be substantially completely reacted before a solution of a polyhydroxy benzene and an aldehyde is added to the amine-aldehyde condensation product which is desirably in a liquid form.

The phenolic type resins in many cases exhibit a tendency to precure when being molded or hot-pressed in relatively thick sections, the outside portion or shell curing quite rapidly while the inside remains under-cured. In this respect the resorcin-aldehyde resins in particular and the polyhydroxy benzene-aldehyde resins in general show the same tendency to precure. It has been determined that this is inhibited or substantially prevented when there is distributed throughout the condensed dihydroxy benzene-aldehyde resin particles of an amine-aldehyde resin, this intimate association being preferably, although not necessarily, effected by condensing the dihydroxy benzene and aldehyde in the presence of already partially or completely condensed amine-aldehyde condensation product. The amine may be a primary or secondary amine, and preferably is an aromatic amine including the di-aryl amines. Exceptionally good results have been obtained using the phenyl amines and their homologs.

It is within the province of the present invention to produce resin condensation products by first condensing either the amine-aldehyde condensation product and then adding thereto, preferably in solution form, a polyhydroxy benzene-aldehyde solution and in situ condensing the latter in the presence of the already partially or completely condensed amine-aldehyde condensation product; or the polyhydroxy benzene, as for example, a dihydroxy benzene typified by resorcin, may be first condensed with an aldehyde and thereafter an unreacted solution of an amine of the character herein set forth and an aldehyde may be added to the already partially or completely condensed polyhydroxy benzene-aldehyde reaction mixture and the condensation of the amine-aldehyde solution effected in situ.

When dihydroxy benzene-aldehyde resins are used to produce molded or laminated articles, there is a tendency for thick articles to case harden; that is, to cure completely on the exterior of the shell portion of the article but leave the inner portion thereof incompletely cured, whereby the strength of the article is greatly reduced and its durability greatly lessened.

The tendency of dihydroxy benzene-aldehyde resins as exemplified by resorcin-formaldehyde resins and resins produced by condensing homologs, derivatives, or substitution products of resorcin or other dihydroxy benzenes with an aldehyde to pre-cure or to case harden is substantially prevented or greatly inhibited when the resin or resin composition is combined with an amine-aldehyde condensation product, said condensation being preferably effected by an in situ condensation of the dihydroxy benzene-aldehyde resin. Articles formed of the composite resin of the present invention exhibit greater strength than if they were made from polyhydroxy benzene-aldehyde resins, and particularly dihydroxy benzene-aldehyde resins. The presence of the amine-aldehyde condensation product probably causes the dihydroxy benzene-aldehyde condensation product to level down, the said amine-aldehyde condensation product filling the voids between adjacent particles of the dihydroxy benzene-aldehyde resin, the dispersion in the voids during the period the dihydroxy benzene-aldehyde reaction mass is being condensed, creating a denser, stronger, and more homogeneous article before the final curing or hardening step is effected in the production of permanently formed articles. These new and valuable properties are conferred on the dihydroxy benzene-aldehyde resins and especially the resorcin-aldehyde resins, and the condensation products of the derivatives and substitution products of the dihydroxy benzenes, and particularly resorcin, with an aldehyde, without impairing the characteristic rapid and low temperature cure of the dihydroxy benzene-aldehyde resins.

It is desired to point out that in the manufacture of aldehyde condensation products of monohydric phenols which are to be "brittled off," a certain stage occurs during the production of the resin wherein the resinous product separates from water, two distinct layers being formed. This separation occurs because of the lack of affinity of the monohydric phenol aldehyde resins for water. However, when a polyhydroxy benzene, as for example, resorcin, is treated with an aldehyde, as for example, formaldehyde, at no stage during the reaction is there any separation of a water layer. The failure of water to separate is characteristic of the hygroscopic nature of resins produced by the condensation of polyhydroxy phenols with aldehydes.

In a great many commercial applications, no problems are presented by the hygroscopic nature of the condensation products of the polyhydroxy benzenes with the aldehydes, it only being necessary that the finished resin be carefully handled to prevent undue absorption causing stickiness and caking. However, in some particular applications of the polyhydroxy benzene-aldehyde resins, hygroscopicity must be eliminated, and this is accomplished by the present invention.

It has been discovered that when an amine-aldehyde condensation product comprises a portion of the dihydroxy benzene-aldehyde resin, particularly the resorcin-formaldehyde resin, the latter no longer gets sticky in humid air or by handling with moist hands. It is desired to point out that the condensation of the polyhydroxy benzene with the aldehyde is preferably effected in the undehydrated condensation product of the amine and the aldehyde, although this latter condensaion may be effected in the presence of a partially or substantially completely dehydrated condensation product of the herein disclosed broad class of amines, and the herein disclosed broad class of aldehydes. In that form of the invention wherein the amine-aldehyde uncondensed product is added to an already partially or substantially completely condensed polyhydroxy benzene and an aldehyde, the latter may also be in an undehydrated condition or in a partially dehydrated condition, or substantially completely dehydrated. However, it is preferred that employing either procedure, the in situ condensation of one of the aldehyde condensation products should be carried out in the presence of a substantially undehydrated already partially or completely condensed aldehyde product of the character herein set forth. When the resulting reaction mixture of the amine-aldehyde condensation product and the polyhydroxy benzene-aldehyde condensation product is dehydrated as an entity, there is formed a homogeneous resinous mass with the properties that can be duplicated in subsequent batches.

In accordance with the present invention, there may be produced an intermediate thermoplastic mixed resin which may be hardened with an aldehydic or methylene-containing hardening agent or with a methylol hardening agent by heating at temperatures as low as 100° to 110° C., and higher temperatures which will not destroy the resin or injure its properties of being substantially infusible and insoluble in ordinary solvents, said terms to be given the meaning which are usually accorded them in the phenol aldehyde condensation art. These two-stage resins carrying admixed therewith a hardening agent are, upon heating, converted into an infusible insoluble state.

Instead of producing a two-stage resin, the composite mixed resin may be condensed with sufficient aldehyde to form a one-step heat-reactive product. This may be attained by adjusting the ratio of the aldehyde, as for example, the formaldehyde, to the polyhydroxy benzene as typified by resorcin. If a two-stage resin is to be produced, the molecular ratio of the resorcin to the formaldehyde should be less than one of the latter to one of the former. If a one-stage resin is desired, the molecular ratio of the aldehyde to the dihydroxy benzene should be greater than 1:1, and preferably vary from 1:1 to 2:1. In general, in a one-stage resin, the molecular ratio of the polyhydroxy benzene to the aldehyde may vary between 1 mol of polyhydroxy benzene to .3 mol as the aldehyde varies between 1 mol to 1.5 mols, depending on the amine-aldehyde ratio.

In general, the amount of amine-aldehyde resin dispersed through the resorcin aldehyde resin present in the composite mixed resin or the amount of the latter dispersed through the former may vary between rather wide limits. For example, when the composite resin is to be used for molding purposes, the amount of amine resin present may vary broadly between 5% to 25%, and usually between 10% to 15%. However, these are merely the preferred percentages and these may be greatly departed from in certain cases. When the composite resin is to be used for dielectric purposes, the amine-aldehyde resin may comprise 35% to 60% of the composite resin, and in certain cases the amine-aldehyde resin may comprise as much as 75% to 80% of the composite resin. In most cases, the mixed resin consists predominantly of a one-step or two-step polyhydroxy benzene aldehyde resin, the amine-aldehyde resin being present in an amount less than 50%. However, for certain purposes, the proportions may be reversed and the amine-aldehyde resin may be present in a predominating proportion.

In accordance with the present invention, a plurality of members may be bonded together with a mixed resin condensation product produced as herein set forth. The bond functioning as an adhesive is exceedingly valuable in the production of laminated articles including laminated wood, plywood, veneered wood, wall board, and in general the uniting of wooden members one to the other, said bonding medium which preferably contains a thermoplastic condensation product in combination with a hardening agent developing adequate strength and waterproof properties when preferably set under heat and desirably under heat and pressure.

The mixed condensation product herein set forth serves admirably as an adhesive medium in the production of laminated articles produced from wood, cloth, leather, natural or synthetic rubber, or minerals such as asbestos, glass fibers, and the like, when said articles and the bonding thereof must be characterized by high dielectric properties, low water absorption, and excellent bonding strength. The adhesive bonding medium of the present invention offers a further advantage of curing or setting to produce a strong and waterproof bond at temperatures as low as 100° to 110° C. The composite mixed resin, because of its low curing temperature, is ideally adapted for use as an adhesive bond in the bonding of materials which would be injured by temperatures which it is necessary to employ when using monohydric phenol-aldehyde resins. The high polarity of the polyhydroxy benzene-aldehyde resins, and particularly the dihydroxy benzene resins, its derivatives and substitution products, said dihydroxy benzene-aldehyde resins being typified by a resorcin-aldehyde resin, is instrumental in producing in the mixed resin a bond of high strength which also has the waterproofness or moisture resistance and good electrical properties of the amine-aldehyde resins, and yet the mixed resin is capable of being cured at a low temperature.

The mixed resins of the present invention are also useful as a constituent of molding compounds where it is desired to avoid any tendency of the molding compound to pre-cure.

The present invention will be illustrated by the following examples:

Example 1

A mixture is made from the following ingredients:

| | Grams |
|---|---|
| Ortho amino diphenyl | 170 |
| 37% formaldehyde | 55 |
| Oxalic acid | 2 |
| Solvent alcohol | 10 |

The ortho amino diphenyl, $C_6H_5C_6H_4NH_2$, is melted and there is then added thereto the oxalic acid dissolved in a solvent therefor, said solvent being preferably alcohol. Other solvents commonly used in the art, either aqueous or non-aqueous, may be employed. To the so-prepared mixture, an aldehyde typified by formaldehyde is gradually added, the reaction ensuing after each addition of aldehyde being preferably allowed to subside before an additional increment of aldehyde is added. Preferably during the period during which the aldehyde is added, the temperature of the reaction mixture is maintained at about 50° C. This temperature may be varied considerably, but for the best results the temperature should be maintained at or about 50° C. When the addition of the aldehyde is completed, the mixture is heat treated until the aldehyde is substantially completely reacted or tied up. In the best form of the invention, the mixture is refluxed at or adjacent about 100° C. for about two to three hours. At the conclusion of the reflux treatment, there is added a solution of a polyhydroxy benzene and an aldehyde, in molecular proportions less than one of the latter to one of the former so that a two-step resin is produced. Illustratively, 55 grams of resorcin may be dissolved in 28 grams of 37% formaldehyde, and the resulting solution slowly added to the reacted solution of the amino diphenyl and formaldehyde. After each increment of the resorcin-formaldehyde solution is added, the reaction is preferably allowed to spend itself before an additional increment of the resorcin formaldehyde solution is added. When the resorcin-formaldehyde solution is completely added, heat is applied and reflux conditions maintained for approximately one hour. Obviously, this period of time will vary. Functionally stated, the reaction mixture should be maintained under reflux conditions for that period of time which will substantially completely react or tie up all of the formaldehyde. After the reaction is substantially completed, the mass may be dehydrated to form a brittle two-step resin which will harden when admixed with a suitable hardening or setting agent such as an aldehydic hardening agent including a methylene containing hardening agent or a methylol containing hardening agent. The final dehydrated mass in admixture with the hardening agent is characterized by the property of hardening or setting at temperatures as low as 100° or 110° C. Preferably, the reaction mass is dehydrated until it has a moisture content varying between 0.1% to 2.0% and preferably .1% to 1.0% taken on the weight of the finished resin. It is to be noted that the catalyst; namely, oxalic acid, has been dissolved in a non-aqueous solvent, thereby facilitating the dehydration step. While dehydration is usually desirable, it is within the province of the present invention to utilize the reaction mass in its undehydrated form. The setting or hardening agent may be added broadly in an amount varying between 1% to 30% taken on the weight of the dehydrated resin, but preferably should vary between 5% to 20%, and most desirably 8% to 15% taken on the weight of the dehydrated resin.

Example 2

A mixture is made from the following ingredients:

| | Grams |
|---|---|
| Aniline | 93 |
| 37% formaldehyde | 55 |
| Commercial hydrochloric acid | 9 |

The hydrochloric acid is well mixed with the aniline, $C_6H_5NH_2$, which is also known as phenyl amine, and then the addition of the formaldehyde is initiated. The reaction is quite exothermic and should be run gradually to prevent any loss by rapid boiling. At the conclusion of the addition of the formaldehyde, there is obtained a yellow opaque resinous mass which is separated from its water content, leaving a water layer adjacent thereto. Heat is applied in order to complete the condensation reaction. Preferably the mass is heated to a reflux temperature for an appropriate length of time. Usually it is desirable to reflux the reacting mass at or adjacent a reflux temperature of about 100° C. for about two hours, during which period there is an effectual separation of the reacting mass into a resinous layer and an aqueous layer. The so-produced resinous mass is preferably not dehydrated at this point, but is allowed to cool. A separate solution is then prepared by dissolving 110 grams of resorcin in 55 grams of 37% formaldehyde, the resorcin-formaldehyde solution being kept at a temperature below that which will allow condensation in the solution to be initiated. Preferably, the solution of resorcin and formaldehyde is kept below 40° C., to inhibit or substantially prevent premature condensation taking place. In all the examples herein set forth, it is desirable that premature condensation of the polyhydroxy benzene-aldehyde solution be prevented prior to the time it is added to the partially or completely condensed amine-aldehyde condensation product. The resorcin-formaldehyde solution is then added to the aniline-formaldehyde condensation product in small increments whereby the energy of reaction is dissipated during the time elapsing between successive additions of the formaldehyde. Preferably the aniline formaldehyde liquid condensation product is cooled below 40° C. before beginning the addition of the resorcin formaldehyde solution. By the time all of the resorcin-formaldehyde solution has been added, the reaction mass has become very stiff. It has been ascertained that the viscosity of the mass may be decreased by simply allowing the mass to stand for a suitable period of time. This change in viscosity from that of an exceedingly stiff mass to that of a mass which has a viscosity varying between honey and glycerine may be accomplished without any heating step. Usually, using the quantities set forth in the present example, viscosity change is effected by allowing the reaction mass to stand from 15 to 30 minutes. However, this time limit is illustrative and not by way of limitation. The changeover in viscosity may be accelerated by slowly heating the mass, as for example, to about 60° to 70° C. Not only is the viscosity of the resulting mass decreased, but the rather thick solution becomes more homogeneous. Thereafter, the resulting solution is refluxed at a refluxing temperature of 100° C. or closely adjacent thereto for that period of time necessary for the reaction to be substantially completed, that is, for the last traces of the formaldehyde to be tied up. Usually refluxing for about an hour's time is sufficient when using the quantities herein set forth in this illustrative example. During the refluxing period, the reaction mass or reaction mixture acquires a viscosity which is approximately that of water. After the reaction is substantially complete, the material may be dehydrated to a moisture content of the order hereinbefore set forth to produce a shining brittle deep red resin quite impervious to water and capable of hardening upon heating with a hardening agent at an exceedingly low temperature of 100° to 110° C., although higher temperatures may be used. The setting agent may be an aldehydic setting agent, but preferably is a methylene containing setting agent such as hexamethylene tetramine or a methylol containing compound, or mixtures of the same. The hardening agent such as the hexamethylene tetramine or the methylol containing compound, or a mixture of the two in any proportions, may be added to the permanently fusible resin produced in amounts broadly varying between 1% to 30% taken on the weight of the dehydrated resin which may contain .1% to 5% of water. However, the hardening agent preferably should be added in an amount varying between 5% to 20%, and most desirably 8% to 15% taken on the weight of the dehydrated resin.

*Example 3*

A mixture is made from the following ingredients:

| | Grams |
|---|---|
| Diphenyl amine | 85 |
| Commercial hydrochloric acid | 5 |
| 37% formaldehyde | 28.5 |

In the above example, the diphenyl amine is illustrative of a secondary aromatic amine. Other aromatic secondary amines, their homologs and their derivatives and/or substitution products may be substituted for the diphenyl amine, $(C_6H_5)_2NH$.

The diphenyl amine and the hydrochloric acid are mixed and warmed to form a homogeneous solution. It is usually sufficient to warm the mixture to between 60° and 65° C., the function of the heating step being to insure the formation of a homogeneous liquid. Thereafter, formaldehyde is gradually added. The formaldehyde separates as it is added. By constant stirring to form an intimate mixture, an exothermic reaction is initiated without further application of heat, the temperature rising gradually to about 80° C. When the temperature begins to fall again, indicating completion of the initial stage of the reaction, it is desirable to again heat the mass in order that the formaldehyde may be substantially completely tied up. Preferably in order to accomplish the latter, it is desirable to heat the reaction mass at a refluxing temperature of about 100° C. or closely adjacent thereto, and this heat treatment is preferably maintained from 30 minutes to one hour. This period of time, utilizing the quantities of material set forth in the example, is sufficient to substantially completely tie up the formaldehyde. Thereafter, the reaction mass is preferably allowed to cool, as for example, to about 30° to 50° C., and thereafter a solution of a polyhydroxy benzene in an aldehyde is added. Preferably there is added a solution of 55 grams of resorcin and 28.5 grams of 37% formaldehyde, this solution being added in increments with constant stirring. The action is exothermic and the temperature rises as each addition of the formaldehyde solution reacts. When the resorcin-formaldehyde solution has been completely added, the mixture is refluxed at or adjacent 100° C. for a sufficient period of time to insure the reaction being completely effected. Usually about 30 minutes to two hours is sufficient. Preferably the reflux is then removed and the resulting mass is evaporated until a brittle substantially dehydrated resin is formed on cooling. This brittle resin is characterized by the properties of being thermoplastic, unaffected by water, and can be heat cured to an infusible insoluble state by admixing therewith an aldehydic setting agent, preferably a methylene containing setting agent or a methylol containing setting agent, or a mixture of the two, in which either constituent predominates. The addition product with the setting agent may be cured at 100° to 110° C. to form an infusible insoluble mass.

In the examples herein set forth, oxalic acid and hydrochloric acid have been used as illustrative of acid catalysts. However, in lieu thereof any of the weak or strong acids may be used. Further examples of the strong mineral acid are sulphuric acid and phosphoric acid. An example of a weak inorganic acid is boric acid. Examples of organic acids which may be used as catalysts are citric acid, salicylic acid, acetic acid, and the like.

Instead of using an acid catalyst, equivalent mild alkaline catalysts may be used, such as borax, sodium hydroxide, azoxy toluidine, aniline, the ethanol amines including triethanol amine or admixtures thereof with monoethanol amine and/or diethanol amine.

While the condensation of the amine and the aldehyde is carried out preferably in the presence of a catalyst, under some circumstances the catalyst may be omitted. However, the use of the catalyst is advantageous. The amount of catalyst used in effecting the condensation of the amine and the aldehyde may in general vary between .1% and 5% taken on the weight of the reacting constituents. Usually, although not necessarily, sufficient catalyst is added so that the in situ condensation of the polyhydroxy benzene and the aldehyde occurs in the presence of some of the catalyst which remains from the amine-aldehyde reaction. A catalyst may be added to the polyhydroxy benzene-aldehyde solution prior to the time it is added to the amine-aldehyde solution, but the addition of the catalyst to the polyhydroxy benzene-aldehyde solution before it is added to the amine-aldehyde solution tends to induce some premature setting of the polyhydroxy benzene-aldehyde solution, and this is undesirable.

While it is highly desirable in most cases to use a catalyst, either acid, alkaline or neutral, as the catalyst is advantageous in accelerating the resin forming reaction, the catalyst may be omitted.

When methylol containing compounds are used as the setting or hardening agent for intermediate permanently fusible thermoplastic resin compositions, such compounds may include dimethylol para cresol, polymethylol phenols, the metal salts thereof including the alkali and the alkaline earth salts, methylol resorcinol, the methylol xylenols, the methylol ureas, including the dimethylol urea, the methylol thioureas, including the dimethyol thiourea, and the methylol melamines.

A solution of polymethylol phenol suitable for use as a setting agent may be prepared in the following manner: 94 grams of phenol are mixed with about 200 c. c. of water containing 50 grams of sodium hydroxide, and to this mixture is added 215 grams of 37% formaldehyde solution. The above ingredients are mixed at room temperatures, that is, at about 20° to 25° C. The mixture of the above constituents is allowed to stand for a substantial period of time in order that the reaction may be completed. The reaction should be carried out at a temperature which will not induce any substantial polymerization of the simple polymethylol phenol which is formed. Experiments indicate that if the temperature rises substantially above 40° to 45° C., that there is a tendency for polymerization to be initiated. It is not desired to be strictly limited to this temperature as with different amounts of the reacting constituents and different concentrations, the temperature may vary considerably from the above. However, the criterion is that the temperature preferably should be maintained at that point which will prevent the initiation of polymerization of the polymethylol phenol. The polymethylol phenol solution prepared as herein described exists as the sodium salt solution and may be used as such. However, by careful neutralization of the solution, using, for example, dilute acetic acid, the polymethylol compound itself exists in solution and may be isolated by ether extraction or other suitable extraction media.

Instead of using formaldehyde as the aldehydic condensing agent, other aldehydes may be used such as acetaldehyde, paraldehyde, propionaldehyde, the butyl aldehydes, the furfuralaldehydes, and the like. Instead of using a single aldehyde, it is within the province of the present invention to use as a condensing medium for each of the resins herein disclosed, a mixture of aldehydes such as a mixture of formaldehyde and butyl aldehyde. Dialdehydes or mixtures of dialdehydes may be used in place of the monoaldehydes. As a representative of a di-aldehydic condensing agent, glyoxal is set forth.

While the present invention has been set forth in connection with utilization of resorcin as the dihydroxy benzene, it is within the province of the present invention to use catechol or hydroquinone and substitution products or derivatives thereof. Examples of the substituted resorcins which may be used in carrying out the present invention include secondary alkyl resorcins, in which the alkyl member is a lower alkyl or a higher alkyl; resorcin ethers including monomethyl resorcyl ether; resorcin esters including resorcin disulphonic acid esters, and the like. Trihydroxy benzene compounds may also be used in carrying out the present invention. Examples thereof are pyrogallol and phloroglucinol and their derivatives and/or substitution products. Homologs of the dihydroxy and trihydroxy benzenes may also be used.

The mixed resins herein disclosed and their equivalents produced in accordance with the general disclosure of the present application may be used as bonding and/or adhesive mediums for the gluing or cementing of articles of all kinds together, including laminated wood, plywood, wooden articles, and the uniting or bonding together of articles at least one of which is a metal article or a natural or synthetic plastic. The resins herein set forth may be used in the preparation of varnishes for use in the production of laminated articles, and also molded articles may be made from the condensation products herein set forth.

The resin condensation product herein produced may be used in the production of airplane structures, boats, furniture, light structural sections such as beams and arches. The invention is of particular value in the production of laminated wood, plywood, or wherever it is desirable to bond plies of cellulosic material to each other or to provide a laminated or panel structure which may comprise a layer of wood together with a layer of cotton fibers, cloth or asbestos. The plies which are bonded with the adhesives of the present invention may be inorganic in character, as for example, asbestos, glass fibers, and the like.

In the production of airplane structures and boat structures, instead of the alternate plies or layers being of wood, there may be a layer of wood, then a layer of cotton fibers or cloth or asbestos, and then a layer of wood and another layer of cotton fibers or cloth or asbestos. In other words, it is not necessary that both plies be of wood. Only one ply need be of wood and in some cases, the invention may be carried out by using plies of cloth, cotton or other textile material or plies of inorganic material which may be mineral in character, typified by asbestos.

In the production of large structural articles, such as large sections of airplanes, large objects of furniture, and sections of boats, such as the hull of a dinghy, the lamination of the formed article by the conventional methods of pressing is difficult due to the size of the articles being formed. In such cases, it is desirable to wrap the object around the form or use the technique of bag molding in an autoclave. In cases such as this, it has been found that the polyhydroxy benzene resins, including the dihydroxy benzene resins produced by condensing a polyhydroxy benzene compound including the dihydroxy benzene compounds with a methylol containing component, are particularly advantageous because the heat penetration of such large objects is much more difficult than standard small size panels, and the low temperature curing of the polyhydroxy benzene resins lowers the time cycle and the temperature necessary to produce the proper bonding.

Employing bag molding, the laminae with the adhesive applied are placed in position either inside or outside of a hard mold. Pressure is then applied by means of a paper, rubber or Cellophane bag which is wrapped around the piece or inserted in the core of the piece and pumped up with air, hot water or steam to the desired pressure. Pressures in this case generally range from 50 to 60 pounds per square inch. In many cases, the whole assembly is slid into an autoclave and baked at a temperature sufficient to cure the resin.

The mixed resins produced in accordance with the present invention may be used in the preparation of molding compounds, the latter being well known in the art. The following is a representative example of a suitable molding compound:

| | Parts |
|---|---|
| Mixed resin compound | 50 |
| Woodflour | 48 |
| Dye | 1½ |
| Lubricant | ½ |

This composition is worked and blended on heated friction rolls, as is well known in the art. The resin compound referred to in the above composition may be composed of any of the mixed resins herein set forth. The mixed resin has present a hardening agent of the type herein set forth, as for example, hexamethylene tetramine or a methylol containing material. This hardening agent may vary between 1% to 30% taken on the weight of the mixed resin, but preferably varies between 5% and 20%, and most desirably between 8% and 15% taken on the weight of the mixed resin.

It is obvious that the woodflour may be substituted in part or totally by mineral fillers such as calcium carbonate, kieselguhr, which are illustrative of inorganic fillers, and by other cellulosic materials or the equivalents thereof which are representative of organic fillers. In other words, the filler may be an organic filler, as well known in the art, or an inorganic filler.

After a homogeneous mixture has been made on the rolls, the material may be cooled and prepared by methods well known in the art.

Having thus described the invention, what is claimed as new and desired to be secured by Letters Patent is:

1. The method of producing a fusible thermoplastic composite resin containing 5% to 80% of an aromatic amine-aldehyde resin, the balance of the resin being a fusible resorcin-aldehyde resin comprising condensing a resin-forming aromatic amine selected from the group consisting of primary aryl amines and secondary di-aryl amines with an aldehyde in the presence of a catalyst, reacting the aromatic amine and the aldehyde to the substantial elimination of the free aldehyde and producing a thermoplastic resin, and slowly adding to and heat-reacting in the presence of the preformed condensed aromatic-amine-aldehyde resin, a solution of a resorcin and an aldehyde until all of the aldehyde is substantially completely tied up, the molar ratio of the aldehyde to the resorcin being less than 1:1 to produce a fusible resin, and dehydrating the resulting thermoplastic product to form a thermoplastic brittle resin.

2. The method of producing a thermoplastic resin containing 5 to 80% of an aromatic amine-aldehyde resin, the balance of the resin being a polyhydroxy benzene-aldehyde resin comprising condensing a resin-forming aromatic amine selected from the group consisting of primary aryl amines and secondary di-aryl amines with an aldehyde in the presence of a catalyst, reacting the aromatic amine and the aldehyde to the substantial elimination of the free aldehyde and producing a thermoplastic resin, slowly adding to and heat-reacting in the presence of the preformed condensed aromatic amine-aldehyde resin, a solution of a polyhydroxy benzene and an aldehyde until all of the aldehyde is substantially completely tied up, said polyhydroxy benzene and the aldehyde being present in the molar ratio of less than one of the aldehyde to one of the polyhydroxy benzene, and dehydrating the resulting thermoplastic product to form a thermoplastic resin.

3. The method of producing a composite resin comprising condensing a resin-forming aromatic amine selected from the group consisting of primary aryl amines and secondary di-aryl amines with an aldehyde and forming a thermoplastic aromatic amine-aldehyde resin constituting 5% to 80% of the composite resin, mixing therewith a solution containing unreacted aldehyde and unreacted polyhydroxy benzene, the molar ratio of the former to the latter being less than 1:1, and reacting said latter solution in the presence of the pre-condensed aromatic amine-aldehyde resin.

4. The product of the method of claim 3.

5. The method of claim 3 in which the polyhydroxy benzene is a dihydroxy benzene.

6. The product of the method of claim 5.

7. The method of claim 3 in which the polyhydroxy benzene is resorcin and the aldehyde which is reacted therewith is formaldehyde.

8. The product of the method of claim 7.

9. The method of claim 2 in which the polyhydroxy benzene is resorcin.

10. The method of claim 2 in which the polyhydroxy benzene is resorcin and the aldehyde which is reacted therewith is formaldehyde.

11. The method of claim 1 in which the aldehyde which is reacted with the resorcin is formaldehyde.

PHILIP HAMILTON RHODES.

REFERENCES CITED

The following references are of record in the file of this patent:

UNITED STATES PATENTS

| Number | Name | Date |
|---|---|---|
| 1,955,731 | Bender | Apr. 24, 1934 |
| 1,168,626 | Goldsmith | Jan. 18, 1916 |
| 2,127,894 | Sutter | Aug. 23, 1938 |
| 2,029,012 | Beans | Jan. 28, 1936 |
| 1,999,716 | Billings | Apr. 30, 1935 |
| 1,599,627 | Achtmeyer | Sept. 14, 1926 |
| 1,889,751 | Kessler | Dec. 6, 1932 |
| 1,849,109 | Novotny | Mar. 15, 1932 |
| 2,333,754 | Wassenegger | Nov. 9, 1943 |

FOREIGN PATENTS

| Number | Country | Date |
|---|---|---|
| 497,118 | France | Aug. 30, 1919 |
| 433,666 | Great Britain | Aug. 19, 1935 |